United States Patent Office 3,340,454
Patented Sept. 5, 1967

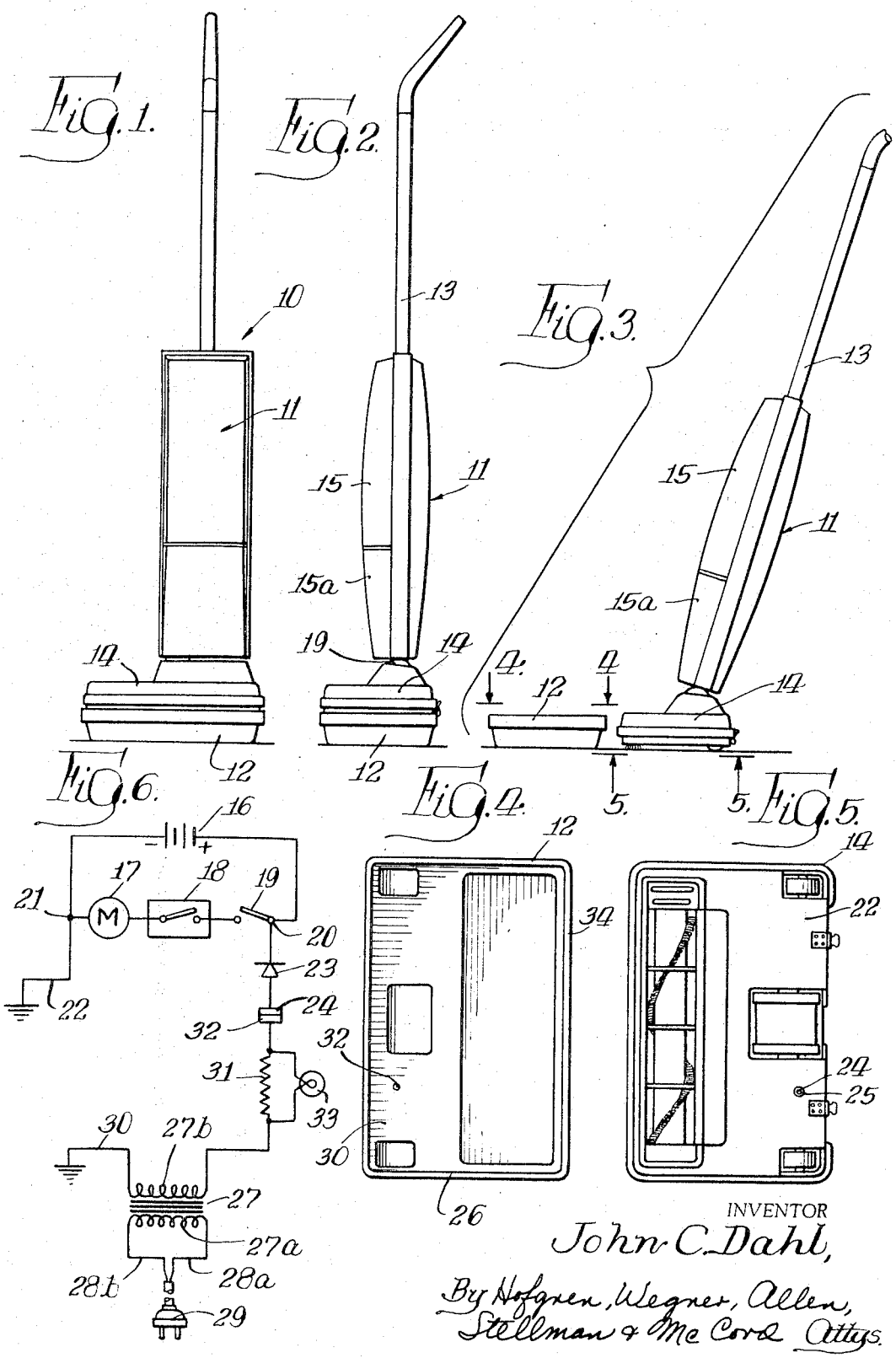

3,340,454
RECHARGEABLE BATTERY-OPERATED
VACUUM CLEANER
John C. Dahl, St. Paul, Minn., assignor to Whirlpool
Corporation, a corporation of Delaware
Filed Nov. 23, 1964, Ser. No. 413,027
1 Claim. (Cl. 320—22)

ABSTRACT OF THE DISCLOSURE

A rechargeable battery-operated apparatus including a charger for separably carrying the apparatus and having a signal light in parallel with a relatively low ohmic value resistor permitting selective control of the charging rate by selective installation of different wattage signal light lamps whereby the resistor provides the basic control of the charging rate and the signal light lamp provides adjustment thereof.

Specification

This invention relates to electrical apparatus and in particular to battery-operated electrical apparatus.

In a number of modern appliances, such as tooth brushes electric shavers, vacuum cleaners, and the like, the electrical power is provided in the form of a battery which is mounted in the housing of the apparatus. To recharge the battery after use, charging apparatus is associated with the appliance so that during the times when the appliance is not in use the battery may be slowly recharged.

It has been found desirable to provide a terminal arrangement in such apparatus which permits the association of the battery with the charger simply by placing the appliance on the charger apparatus. Thus, for example, where the appliance comprises a vacuum cleaner, when the housewife finishes vacuuming, it is desirable that she need merely place the bottom of the cleaner unit on the charger apparatus whereupon an electrical connection is made between the charger and battery to effect the recharging thereof automatically.

A problem arises, however, in such structure in that exposed terminals of the appliance may permit an accidental shorting of the battery, such as where the appliance is set on a conductive element such as a metal plate. In such instances, an electrical circuit may be established from one terminal to the other through the conducting element, thereby discharging the battery. Such discharge at high current rates may seriously damage the battery and at best presents an undesirable condition wherein the user finds that she is unable to utilize the appliance until subsequent recharging of the battery is contemplated.

Another disadvantage of the known structures of this type lies in the relatively costly means provided for providing variable charge rates. Various devices have been employed in the known charges for effecting such variable charging rates, but have had the disadvantages of relatively high expense and complexity.

The present invention comprehends an improved structure wherein the above discussed disadvantages of the known battery-operated devices are effectively eliminated in a novel and simple manner.

Thus, a principal feature of the present invention is the provision of a new and improved structure including a battery-operated apparatus and a charger separably carrying the apparatus wherein new and improved means are provided for effectively precluding inadvertent discharge of the battery as by accidentally shorting the terminals thereof.

Another feature of the invention is the provision of such a structure wherein said discharge preventing means include means for permitting only unidirectional current flow from one of the terminals of the apparatus to the battery.

A further feature of the invention is the provision of such a structure comprising apparatus having an electrically operable device, means for selectively operating the device including a battery, terminal means, and means connected between the terminal means and the battery for unidirectionally conducting electrical current to the battery, and a charger separably carrying the apparatus and having terminal means conductively engaging the terminal means of the apparatus when the apparatus is carried thereon for delivering electrical current through the terminal means and the unidirectionally conducting means to the battery for charging the battery, the unidirectionally conducting means precluding current flow from the battery between the terminals.

Still another feature of the invention is the provision of such a structure having new and improved means for providing adjustable charging rates of the charger.

Other features and advantages of the invention will be apparent from the following description taken in connection with the accompanying drawing wherein:

FIGURE 1 is a front elevation of a vacuum cleaner structure embodying the invention;

FIGURE 2 is a side elevation thereof;

FIGURE 3 is a side elevation thereof with the vacuum cleaner removed from the charger base;

FIGURE 4 is a top plan view of the charge base;

FIGURE 5 is a bottom plan view of the vacuum cleaner; and

FIGURE 6 is a wiring diagram schematically illustrating the control circuitry of the vacuum cleaner structure.

In the exemplary embodiment of the invention as disclosed in the drawing, a vacuum cleaner generally designated 10 is shown to comprise a battery-operated vacuum cleaner 11, and a charger base 12 separably carrying the vacuum cleaner during periods of nonuse. In utilizing the vacuum cleaner, the user merely lifts the vacuum cleaner from the charger base and operates the vacuum cleaner in the normal manner by moving it over the surface to be vacuumed, the elimination of the conventional electrical cord providing improved facility in such use. The charger base is arranged to be connected to a normal home electrical outlet (not shown) to provide automatically to the vacuum cleaner a suitable electrical current for recharging the vacuum cleaner during the period the vacuum cleaner is carried on the charger base.

The vacuum cleaner 11 is of generally conventional construction including a handle 13 extending upwardly from a base 14 and provided with a dirt collecting dust bag structure 15. Below bag 15 is a housing 15a to contain a battery 16. Base 14 contains a direct current motor 17, and a circuit breaker 18. A suitable on-off switch 19 may be provided on the base 14 or handle 13 as desired for controlling the operation of the motor 17 which, as shown in FIGURE 6, is connected in a series circuit with the circuit breaker 18 and switch 19 across the terminals 20 and 21 of the battery. As shown in FIGURE 6, the terminal 21 is grounded such as to the metal bottom plate 22 of the vacuum cleaner base 14.

Also mounted in the base 14 is a rectifier 23 which is connected to the battery terminal 20 and to a connector terminal 24 which, as shown in FIGURE 5, comprises a female socket carried in insulator 25 mounted in plate 22.

The charger base 12 includes a housing 26 in which is provided a transformer 27 having a primary winding 27a connected through suitable wires 28a and 28b to a conventional plug 29 for connection to an electrical power supply, such as a conventional wall socket (not shown).

As shown in FIGURE 6, wire 28b is connected to one end of the primary transformer and may be grounded such as to a metal bottom plate 30 on the housing. The secondary winding 27b of the transformer is connected at 28a to a resistor 31 which, in turn, is connected to a male connector plug 32 extending from the charger base 26 to be received in the female connector 24 when the vacuum cleaner base 14 is set in place on the charger base. A charge indicator bulb 33 is connected in parallel with the resistor 31 for indicating the operation of the charger. In the illustrative embodiment, the transformer 27 is arranged to provide, from a primary voltage of approximately 110 volts A.C., a secondary voltage of approximately 14 volts. The resistor 31 herein has a value of approximately 10 ohms and the bulb 33 comprises a 5-volt, 9 milliampere bulb. The charger is suitably sized to provide approximately 175 milliamperes charging current as thus arranged. The battery 16 may comprise an 8 cell nickel-cadmium battery of conventional construction having a rating of approximately 4 ampere hours at 9.6 nominal voltage.

By substituting charge indicator bulbs 33 of different ohmic value, a variation in the charge rate of the charger 12 may be effected herein. Illustratively, by employing a bulb 33 of suitably lesser ohmic value, the charge rate may be increased up to approximately 300 milliamperes, or by employing a bulb of suitably high ohmic value the charge rate may be decreased to approximately 100 milliamperes.

To facilitate the connection of the electrical circuit of the vacuum cleaner to that of the charger base, the base is provided with an upstanding wall 34 which snugly receives the bottom portion 14 of the vacuum cleaner to automatically position the terminal 24 of the vacuum cleaner in alignment with terminal 32 of the charger base during placement of the vacuum cleaner on the charger base, thereby automatically effecting the recharging operation.

Thus, the housewife may locate the charger base permanently as in a broom closet with the plug permanently attached to a power supply. When she decides to use the vacuum cleaner, she need merely lift the vacuum cleaner from the charger base and use the vacuum cleaner in the conventional manner without the requirement of an electric cord attached to the vacuum cleaner being connected to a power supply, such as a wall outlet, during this time. Upon completion of use of the vacuum cleaner, she need merely replace the vacuum cleaner on the charger base with the wall 34 of the base automatically guiding the bottom 14 of the vacuum cleaner into proper position for reconnecting the vacuum cleaner male terminal 24 to the charger female terminal 32. The ground metal plate 22 of the vacuum cleaner automatically engages the metal plate 30 of the charger base 12 to complete the circuit to the battery 16.

As shown in FIGURE 6, the rectifier 23 permits a unidirectional current, i.e. a direct current from terminal 24 to battery 16, for effectively recharging the battery. However, should the housewife inadvertently place the vacuum cleaner on a metal surface wherein any portion thereof projects into engagement with the terminal 24, the rectifier 23 provides the additional function of precluding a discharge of the battery through the shorting conductive metal surface.

Should the housewife find that her use of the vacuum cleaner is such that the battery 16 does not fully recharge during the normal period of nonuse, a change in the charging rate may be readily effected by suitably changing the indicator bulb as discussed above. The indicator bulb further automatically tells the housewife that she has properly placed the vacuum cleaner on the charger base, thus preventing an accidental failure to effect the necessary recharging of the battery after a use of the vacuum cleaner.

In describing the invention, I have illustrated the inventive concept in connection with only one type of apparatus, namely, a vacuum cleaner. It is obvious to those skilled in the art that the novel inventive concepts disclosed herein are equally applicable to other appliances and apparatus wherein a battery-operated means is separably associated with a charger means.

While I have shown and described certain embodiments of my invention, it is to be understood that it is capable of many modifications. Changes, therefore, in the construction and arrangement may be made without departing from the spirit and scope of the invention as defined in the appended claim.

The embodiments of the invention in which an exclusive property or privilege is claimed are defined as follows:

Structure comprising:
wheeled apparatus having a battery, a means adapted to be operated by electrical current from said battery, pair of terminals including one terminal connected to one side of said battery, means connected between the other of said terminals and the other side of said battery for unidirectionally conducting electrical current to said battery, and means for selectively connecting said device across said battery; and a charger separably carrying said apparatus and having terminal means conductively engaging said terminals of said apparatus when said apparatus is carried thereon for delivering electrical current through said terminal means and said unidirectionally conducting means to said battery for charging the battery, said unidirectionally conducting means precluding current flow from said battery between said terminals notwithstanding a conductive connecting thereof, said charger further including a signal light means connected in series with said charger terminal means whereby said signal light means indicates a connection of the terminal means of said apparatus to the terminal means of said charger proper for charging of said battery, said signal light means including a voltage-dropping resistor and a lamp having an operating resistance substantially greater than that of said resistor, said lamp being connected in parallel with said resistor for maintaining a substantial charging current flow to said battery notwithstanding a burnout of said lamp, said signal light means including means for connecting any one of a plurality of lamps having different resistances in parallel with said resistor for selectively varying the charging current over a range of up to approximately three to one, and said terminal means including male and female connecting means.

References Cited

UNITED STATES PATENTS

| | | | |
|---|---|---|---|
| 3,143,697 | 8/1964 | Springer | 320—2 |
| 3,184,775 | 5/1964 | Downey | 320—2 X |
| 3,200,320 | 8/1965 | Mallory | 320—2 |
| 3,209,230 | 9/1965 | Mas | 320—48 X |
| 3,214,670 | 10/1965 | Schaf | 320—22 X |
| 3,217,224 | 11/1965 | Sherwood | 320—2 |
| 3,273,038 | 9/1966 | Miller | 320—2 |

JOHN F. COUCH, *Primary Examiner.*

S. WEINBERG, *Assistant Examiner.*